(12) United States Patent
Cash

(10) Patent No.: US 7,828,451 B2
(45) Date of Patent: Nov. 9, 2010

(54) DEEP SHADOW OCCULTER

(75) Inventor: Webster Cash, Boulder, CO (US)

(73) Assignee: The Regents of the University of Colorado, a body corporate, Denver, CO (US)

( * ) Notice: Subject to any disclaimer, the term of this patent is extended or adjusted under 35 U.S.C. 154(b) by 632 days.

(21) Appl. No.: 11/781,143

(22) Filed: Jul. 20, 2007

(65) Prior Publication Data

US 2008/0180802 A1 Jul. 31, 2008

Related U.S. Application Data

(60) Provisional application No. 60/832,535, filed on Jul. 20, 2006.

(51) Int. Cl.
*G02B 27/00* (2006.01)

(52) U.S. Cl. .................................. 359/613; 359/601

(58) Field of Classification Search .............. 359/399, 359/601, 613
See application file for complete search history.

(56) References Cited

U.S. PATENT DOCUMENTS

2009/0153938 A1* 6/2009 Arenberg et al. ............ 359/234

OTHER PUBLICATIONS

Cash, Webster, "Detection of Earth-Like Planets Around Nearby Stars Using a Petal-Shaped Occulter," Nature, vol. 442, pp. 51-53, Jul. 6, 2006.

Cash, Webster et al., "Direct Studies of Exo-Planets With the New Worlds Observer," Proceedings of SPIE, vol. 5899, 12 pages, 2005.
Copi, Craig J. et al., "The Big Occulting Steerable Satellite (Boss)," The Astrophysical Journal, vol. 532, pp. 581-592, Mar. 20, 2000.
Marchal, C., "Concept of a Space Telescope Able to See the Planets and Even the Satellites Around the Nearest Stars," Acta Astronautica, vol. 12, No. 3, pp. 195-201, 1985.
Purcell, J. D. et al., "Coronagraph With Improved Scattered-Light Properties," J. Opt. Soc. Am., vol. 47, pp. 596-597, 1957.
Seager, S., "The Search for Extrasolar Earth-Like Planets," Earth and Planetary Science Letters, vol. 208, pp. 113-124, 2003.
Spitzer, Jr., Lyman, "The Beginnings and Future of Space Astronomy," American Scientist, pp. 473-484, 1962.

* cited by examiner

*Primary Examiner*—Joshua L Pritchett

(74) *Attorney, Agent, or Firm*—Towsend and Townsend and Crew LLP

(57) ABSTRACT

Methods and apparatus are disclosed for occulting light. The occulter shape suppresses diffraction at any given size or angle and is practical to build because it can be made binary to avoid scatter. Binary structures may be fully opaque or fully transmitting at specific points. The diffraction suppression is spectrally broad so that it may be used with incoherent white light. An occulter may also include substantially opaque inner portion and an at least partially transparent outer portion. Such occulters may be used on the ground to create a deep shadow in a short distance, or may be used in space to suppress starlight and reveal exoplanets.

23 Claims, 6 Drawing Sheets

DEEP SHADOW OCCULTER

CROSS-REFERENCES TO RELATED APPLICATIONS

This application is a non-provisional, and claims the benefit, of commonly assigned U.S. Provisional Application No. 60/832,535, filed Jul. 20, 2006, entitled "Deep Shadow Occulter," the entirety of which is herein incorporated by reference for all purposes.

STATEMENT AS TO RIGHTS TO INVENTIONS MADE UNDER FEDERALLY SPONSORED RESEARCH OR DEVELOPMENT

The U.S. government may have rights in this invention under NASA Grant No. NAS5-03110.

BACKGROUND OF THE INVENTION

This application relates generally to the fields of diffraction control, high contrast imaging, and coronagraphy. More specifically, this application discloses an occulter for creation of very deep shadows across optimally small angles.

Sometimes faint objects of interest appear close to much brighter sources of less interest. All optics contain some level of scattering and diffraction that can swamp the faint signal with stray light from the bright source. As the angular separation becomes smaller and the ratio of brightness becomes larger, seeing the faint object gets rapidly more difficult.

High contrast imaging has a number of applications including capturing an image when the target is actually trying to blind the observer, and attempting to image reflections close to a bright source. Particular applications considered herein address revealing planets circling other stars. To find and directly observe Earth-like planets, one needs to study stars as distant as 10 parsecs. The Earth is $10^{10}$ times fainter than the Sun and at 10 pc is less than a tenth of an arcsecond away.

An occulter is an opaque or partially transmitting mask that is placed in the field of view of a camera or telescope. It throws a shadow of the bright source onto the optic. Occulters have the singular property that they remove most of the radiation from the bright source before it enters the imaging optics. Light from the faint source enters unimpeded and may be viewed without interference from the bright one.

The problem of diffraction in small angle shadows is very old. In 1818 the presence of Arago's Spot (a concentration of diffracted light on the axis of a small, round occulter) convinced the scientific world of the validity of the Fresnel-Huygens wave formulation of light. But often the light diffracting around the edge of an occulter lowers contrast and ruins the performance of the system.

Occulters and coronagraphs have been in operation for many years, and the use of spokes (like the teeth on a gear) have been long known to improve the diffraction properties of an occulter, such as described in Purcell, J. D., Koomen, M. J., Coronagraph with Improved Scattered-Light Properties", Report of NRL Progress, US GPO, Washington, D.C. (1962), the entire disclosure of which is incorporated herein by reference for all purposes. These designs typically achieved suppression ratios of $10^5$ or higher.

In Spitzer, L., "The Beginnings and Future of Space Astronomy", American Scientist, 50, 473-484 (1962), the entire disclosure of which is incorporated herein by reference for all purposes, the possibility was suggested of using an occulter in space in concert with a large space telescope to suppress starlight and improve contrast in telescopes near to the parent star. In Marchal, C., "Concept of a space telescope able to see the planets and even the satellites around the nearest stars", Acta Astronautica, 12, 195-201 (1985), the entire disclosure of which is incorporated herein by reference for all purposes, a more thorough analysis was presented with the goal of revealing exoplanets. He discussed flower shaped occulters, but his apodization function could only achieve $10^{-5}$ across a tenth of an arcsecond and required a full arcsecond to achieve $10^{-10}$. Since we need $10^{-10}$ across a tenth of an arcsecond to fully reveal exoplanets, his suggestion was never implemented.

Since the discovery that planets abound around the nearby stars as described in Seager, S., "The Search for extra-solar Earth-like planets," *Earth and Planetary Science Letters,* 208, 113-124 (2003), the entire disclosure of which is incorporated herein by reference for all purposes, interest in direct observation of exoplanets has grown. NASA has been funding studies of the Terrestrial Planet Finder, a telescope of such consummate perfection that it can focus light to $10^{-10}$ contrast across a tenth of an arcsecond. This telescope features a monolithic mirror 4×8 m in extent and an internal coronagraph. Studies are showing that cost is very high and it will be difficult to achieve low scatter over a broad spectral band.

A more recent look at occulters for the planet-finding application showed some promise as described in Copi, C. J., and Starkman, G. D., The Big Occulting Steerable Satellite (BOSS), *Astrophysical Journal,* 532, 581-592 (2000), the entire disclosure of which is incorporated herein by reference for all purposes. They used a transmitting starshade and a more generalized apodization function. They claim starlight suppression as good as $4\times10^{-5}$ with potential for even higher. However, the scatter caused by the transmitting shade creates a practical limit near $10^{-5}$ anyway.

The direct observation of planets has been impeded by a general need in the art for an occulter that meets all of the conditions for practicality in terms of suppression ratio, cost, binary, size, and tolerance.

BRIEF SUMMARY OF THE INVENTION

Embodiments of the invention provide methods and apparatus for occulting light. The occulter shape suppresses diffraction at any given size or angle and is practical to build because it can be made binary to avoid scatter. Binary structures may be only fully opaque or fully transmitting at any point. The diffraction suppression is spectrally broad so that it may used with incoherent white light. Embodiments of the invention find a number of different applications. For instance, on the ground, an occulter made in accordance with an embodiment may be used to create a deep shadow in a short distance. In space, an occulter made in accordance with an embodiment may be used to suppress starlight and reveal exoplanets.

In some embodiments, an occulter implements an opacity apodization function of the form $$\begin{cases} \exp\left(-\left(\frac{\rho-a}{b}\right)^n\right) \text{ for } \rho > a, \\ 1 \text{ for } \rho \le a \end{cases}$$

where $\rho$ is a distance from a center of the occulter, a and b are predetermined constants having dimensions of length, and n is a predetermined dimensionless constant. In some instances, to create deeper shadows, b is substantially equal to a, and $$\frac{b^2 k}{F} \frac{b^2 k}{F}$$

may be substantially greater than n, where k is a wave number of light incident on the occulter and F is a distance from the occulter to a focal plane.

In some instances, the occulter is substantially cylindrically symmetric. For instance, an opacity of the occulter may vary radially from an axis of the occulter. Alternatively, the occulter may have an interior region that is substantially opaque to light incident on the occulter and an outer region that is at least partially transmissive to the light. In one embodiment, a is a radius of the inner region and b is a width of the outer region. The outer region might comprise a plurality of petal-shaped protrusions, with different embodiments having fewer than 50 of the petal-shaped protrusions or having fewer than 20 of the petal-shaped protrusions.

In another embodiment of the invention an occulter, as described in other embodiments of the invention, may be coupled with a telescope. The satellite may be pointed toward an astronomical object such that the occulter obscures an astronomical object.

BRIEF DESCRIPTION OF THE DRAWINGS

A further understanding of the nature and advantages of the present invention may be realized by reference to the remaining portions of the specification and the drawings.

DETAILED DESCRIPTION OF THE INVENTION

Embodiments of the invention provide an occulter design that is capable of separating starlight from planet light to very high contrast levels before it enters a telescope thereby sidestepping the requirements on scatter in the telescope. In some embodiments of the invention an occulter is described that may provide an acceptable combination of suppression ratio, cost, binary, size, and tolerance. The occulter may also exhibit high efficiency across a large band of the spectrum. It is adaptable to the requirements of astronomy or other disciplines. Embodiments of the invention may also solve the twin problems of how to suppress both diffraction and scatter.

Certain aspects of the invention may provide improved formulation for diffraction control in certain circumstances based on the well established Fresnel equations, permitting the suppression of diffraction to be demonstrated theoretically by reliable physics and mathematics.

Figure 1A:
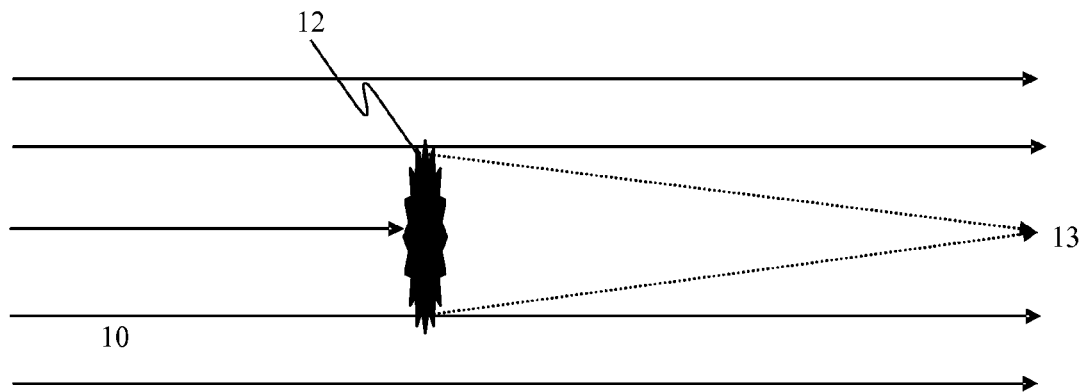
FIG. 1A shows parallel light incident on an occulter.
Figure 1B:
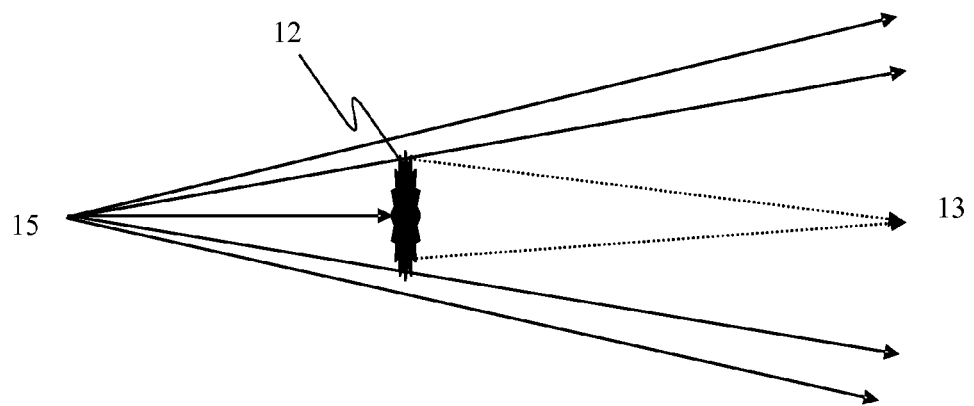
FIG. 1B shows light diverging from a point at a distance incident on an occulter.

An occulter is an opaque object of some arbitrary shape that stops direct light from reaching a target, for example, a detector. The occulter, may comprise a sheet of material. An occulter allows light from another source to pass if it is sufficiently far off the line of sight. FIG. 1A shows parallel light 10 incident on an occulter 12 that may include an opaque or partially transmitting sheet. Despite the occulter, some of the light diffracts into the center of the shadow 13. The same effect may occur from a nearby point source 15 as shown in FIG. 1B.

Apodizing Masks

The mathematical formulation of the Huygens-Fresnel principle states that the electric field at some focal plane, a distance r from a plane aperture, illuminated by a uniform plane wave from infinity is given by:

$$E = \frac{E_0}{i\lambda r} \int\int A e^{ikr} dS \tag{1}$$

where the integration is over the surface S. $E_0$ is the strength of the electric field of the radiation incident from infinity onto the surface and r is the distance from each point on the surface to the point in the focal plane that is being evaluated. k is the usual $2\pi/\lambda$ and A is the apodization function on the occulter plane.

Figure 2A:
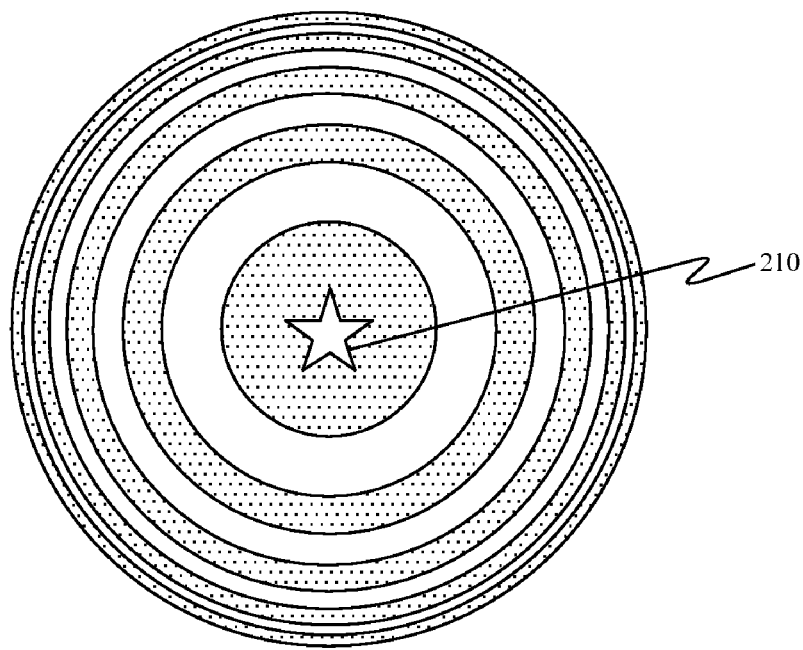
FIG. 2A shows central Fresnel zones with a dark star representing a mask confined to the region where the Fraunhoffer approximation is in effect according to one embodiment of the invention.

FIG. 2A shows the central Fresnel zone and the inner half zones along with mask 210 confined to a region where the Fraunhoffer approximation can be used. The mask may be integrated out in order to provide a new positive contribution in the focal plane.

Figure 2B:
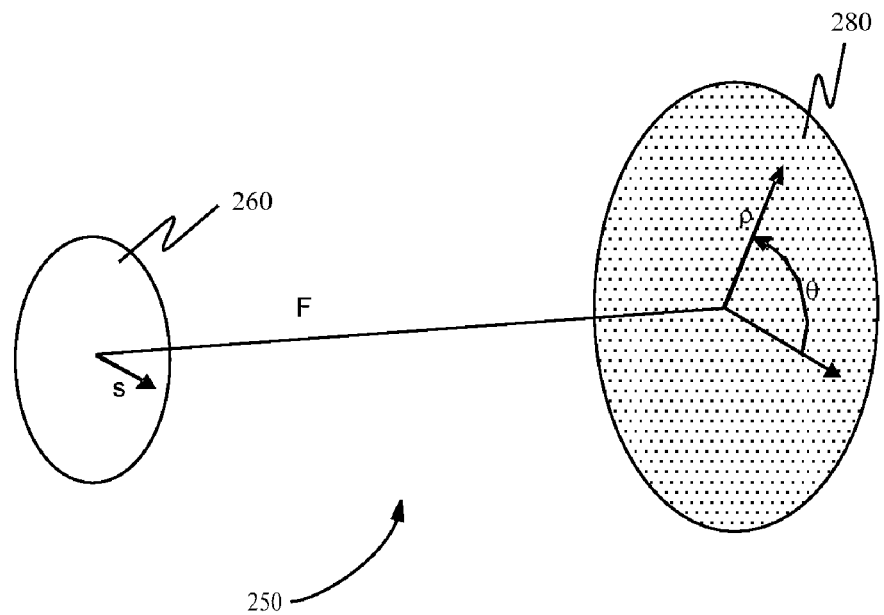
FIG. 2B defines a coordinate system for an occulter according to one embodiment of the invention.

FIG. 2B defines a coordinate system that may be used to describe embodiments of the invention. F is the distance from mask 280 to focal plane 260. $\rho$ is the radius on the mask 280, and $\theta$ is the angle of the mask. s is the distance off axis on the focal plane. Then, following the usual Fresnel approximation for large F $$E = \frac{E_0 e^{ikF} e^{\frac{iks^2}{2F}}}{i\lambda F} \int_0^\infty e^{\frac{ik\rho^2}{2F}} \rho \int_0^{2\pi} A(\theta, \rho) e^{\frac{ik\rho s \cos\theta}{F}} d\theta d\rho. \tag{2}$$

The following equations and discussions may generally follow for a source at a finite or infinite distance. If the source is $F_1$ from the occulter and focal plane $F_2$ from the occulter then F may be replaced by $(F_1 F_2/(F_1+F_2))$.

A circularly symmetric apodization may be approximated by a binary function that appears like petals of a flower for deep shadow apodization. In the case of a circularly symmetric apodization we can first integrate over angle, finding $$E = \frac{E_0 k e^{ikF} e^{\frac{iks^2}{2F}}}{iF} \int_0^\infty e^{\frac{ik\rho^2}{2F}} A(\rho) J_0\left(\frac{k\rho s}{F}\right) \rho \, d\rho. \quad (3)$$

If $A(\rho)$ is unity to some radius a, and zero beyond, and $ik\rho^2/2F$ is small, then this integral leads to an Airy disk that describes the point spread function of the typical diffraction-limited telescope.

The Fresnel integral can be used evaluate the diffraction properties of a mask by integrating over the entire area that is open to transmission. Rather than performing an integral that sums the wavefronts over the entire sky, which may be impractical Babinet's principle may be used to ease the mathematics.

Babinet's principle states that:

$$E_0 = E_1 + E_2 \quad (4)$$

where $E_0$ is the electric field of the signal in the focal plane, unimpeded by a mask, $E_1$ is the field at the focal plane obtained by integrating the Fresnel equations over the shape of the mask as if it were an aperture, and $E_2$ is the field obtained by integrating over all directions outside the mask.

Assuming the unimpeded wave has an amplitude of one and phase of zero at the mask, then $$E_2 = e^{ikF} - E_1. \quad (5)$$

To find a solution to the Fresnel integral over the shape of the mask, then a solution can be found by finding:

$$E_1 = e^{ikF}. \quad (6)$$

We seek a solution in which the electric field integrated over the aperture yields, over some region on the focal plane, the same strength it would have had without an aperture.

For mathematical simplicity we confine ourselves to analysis of the on-axis (s=0) position. The width of the shadow is later calculated numerically from equation (3) as in FIG. 2 of Cash, W., "Detection of Earth-like planets around nearby stars using a petal-shaped occulter," *Nature*, Vol. 422, pp. 51-53 (2006), the entire disclosure of which is incorporated herein by reference for all purposes. When s is much smaller than $F/k\rho$ across the mask, the Bessel function term remains close to one and equation (3) simplifies to $$E = \frac{k}{iF} e^{ikF} \int_0^\infty A(\rho) e^{\frac{ik\rho^2}{2F}} \rho \, d\rho. \quad (7)$$

So we seek a solution such that $$\frac{k}{iF} e^{ikF} \int_0^\infty A(\rho) e^{\frac{ik\rho^2}{2F}} \rho \, d\rho = e^{ikF} \quad (8)$$

or $$\frac{k}{iF} \int_0^\infty A(\rho) e^{\frac{ik\rho^2}{2F}} \rho \, d\rho = 1. \quad (9)$$

Equation (9) shows the difficulty of the problem. The exponential term in the integral is a strong function of wavelength.

The obvious solution to the problem is to make $A(\rho)$ equal to the inverse function out to some radius a:

$$A(\rho) = i e^{\frac{ik\rho^2}{2F}} \quad (10)$$

so that we need only solve $$\frac{k}{F} \int_0^a \rho \, d\rho = 1. \quad (11)$$

While that solution may be simple, it is impractical. Equation (10) describes a perfectly transmitting sheet that phase delays light as a function of radius. Unfortunately, even the slightest change in incident wavelength can create a complete collapse of the nulling. A binary apodization approximation to this device is the Fresnel zone plate.

As is explained Cash, W., Kasdin, J., Seager, S., and Arenberg, J., "Direct studies of exo-planets with the New Worlds Observer", *Proc. Soc. Photo-Opt. Instr. Eng.*, 5899, 274-285 (2005), which has been incorporated by reference for all purpose, we have found a function that satisfies the requirements to high precision. The function is of the form:

$$A(\rho) = e^{-\left(\frac{\rho-a}{b}\right)^n} \text{ for } \rho > a \quad (12)$$

$$A(\rho) = 1 \text{ for } \rho < a.$$

To investigate this effect we have once again used the Fresnel integral as in equation (9)

$$E = \frac{k}{iF} \int_0^a e^{\frac{ik\rho^2}{2F}} \rho \, d\rho + \frac{k}{iF} \int_a^\infty e^{-\frac{(\rho-a)^n}{b^n} + \frac{ik\rho^2}{2F}} \rho \, d\rho. \quad (13)$$

To show this, we first perform a change of variable so that $$\alpha = a\sqrt{\frac{k}{F}} \quad (14)$$

$$\beta = b\sqrt{\frac{k}{F}} \quad (15)$$

and $$\tau = \rho\sqrt{\frac{k}{F}}. \quad (16)$$

So we find $$E = \frac{1}{i} \int_0^\alpha e^{\frac{i\tau^2}{2}} \tau \, d\tau + \frac{1}{i} \int_\alpha^\infty e^{\frac{i\tau^2}{2}\left(\frac{\tau-\alpha}{\beta}\right)^n} \tau \, d\tau \quad (17)$$

and

-continued $$E = 1 - e^{\frac{i\alpha^2}{2}} + \frac{1}{i} \int_\alpha^\infty e^{\frac{i\tau^2}{2} - \left(\frac{\tau-\alpha}{\beta}\right)^n} \tau \, d\tau. \quad (18)$$

The next step is a change of variable to $$x = \frac{\tau - \alpha}{\beta} \quad (19)$$

so that $$E = 1 - e^{\frac{i\alpha^2}{2}} - i\beta \int_0^\infty e^{-x^n} e^{\frac{i}{2}(\beta x + \alpha)^2} (\beta x + \alpha) \, dx. \quad (20)$$

Integration by parts then gives us $$E = 1 - e^{\frac{i\alpha^2}{2}} - e^{-x^n} e^{\frac{i}{2}(\beta x+\alpha)^2} \Big|_0^\infty - n \int_0^\infty e^{\frac{i}{2}(\beta x+\alpha)^2} e^{-x^n} x^{n-1} \, dx \quad (21)$$

or $$E = 1 - n \int_0^\infty e^{\frac{i}{2}(\beta x+\alpha)^2} e^{-x^n} x^{n-1} \, dx. \quad (22)$$

Therefore, equation (9) is satisfied except for a remainder term R. Returning to the coordinates of equation (17) we have $$R = n \int_\alpha^\infty e^{\frac{i\tau^2}{2}} e^{-\left(\frac{\tau-\alpha}{\beta}\right)^n} \left(\frac{\tau-\alpha}{\beta}\right)^{n-1} d\tau. \quad (23)$$

To evaluate this integral we once again integrate by parts:

$$R = e^{\frac{i\rho^2}{2}} e^{-\left(\frac{\tau-\alpha}{\beta}\right)^n} \left(\frac{\tau-\alpha}{\beta}\right)^{n-1} \left(\frac{1}{i\tau}\right) \Big|_\alpha^\infty + \int_\alpha^\infty e^{\frac{i\tau^2}{2}} e^{-\left(\frac{\tau-\alpha}{\beta}\right)^n} f(\tau) \, dt \quad (24)$$

where $$f(\tau) = n\left(\frac{\tau-\alpha}{\beta}\right)^{2n-2}\left(\frac{1}{i\tau}\right) - \frac{n}{i\tau^2}\left(\frac{\tau-\alpha}{\beta}\right)^{n-1} + \frac{n(n-1)}{i\tau}\left(\frac{\tau-\alpha}{\beta}\right)^{n-2}. \quad (25)$$

The first term of (24) is identically zero when evaluated from $\alpha$ to $\infty$, as will be any term that contains both the exponential and a term of positive power in $(\tau-\alpha)/\beta$. Equation (25) has three terms, each of which must be integrated in the second term of equation (24). The first term of equation (25) has a higher power in $(\tau-\alpha)/\beta$ and as such will be a smaller term than the rest of R. The second term is similarly related to R itself, but is smaller by a factor of $n/\tau^2$. Thus, if $\beta^2 >> n$ the third term will dominate. If $\beta^2$ is not larger than n then the transmission rises so quickly near $\rho = \alpha + \beta$ that the shade will start to resemble a disk, and Poisson's Spot will re-emerge.

We proceed to integrate by parts and taking the dominant term until we finally reach a term that does not evaluate to zero, and we find $$R = \frac{n!}{\beta^n} \int_\alpha^\infty e^{\frac{i\tau^2}{2}} e^{-\left(\frac{\tau-\alpha}{\beta}\right)^n} \tau^{1-n} \, d\tau. \quad (26)$$

To approximate the value we consider that cosine terms vary rapidly and will integrate to a net of zero at some point in the first half cycle. That cycle will have a length of no more than $1/\alpha$. During this half cycle the second exponential term remains near one and the term in powers of $\tau$ will never exceed $\alpha(1-n)$. So we can expect that $$R \leq \frac{n!}{\beta^n} \frac{1}{\alpha} \left(\frac{1}{\alpha}\right)^{n-1} = \frac{n!}{\alpha^n \beta^n}, \quad (27)$$

which tells us the accuracy to which the electric field can be suppressed. The square of R is approximately the contrast ratio to be expected in the deep shadow. There were many approximations made to achieve this result and they are only valid in certain parts of parameter space. A large number of small terms were dropped in the repeated integration by parts, which may raise a concern as to the accuracy of equation (27). The validity of this formulation has been checked computationally and found to be reasonable when $\beta^2 >> n$.

Accordingly, an optimally sized occulter may have a approximately equal to $\beta$. Also, to achieve high contrast, $\alpha^n$ must be quite large. This is clearly easier to achieve as n increases, explaining why the higher order curves give more compact solutions, just a few half zones wide. If n gets too high, there are diminishing returns as n! rises and $\beta$ approaches unity. Powers as high as n=10 or 12 can be practical.

This analysis has been carried out for the on-axis position in the focal plane. A telescope may have a significant size and the shadow may then remain sufficiently deep at the mirror's edge. Given the power-law nature of the shadow depth, designing a shade by replacing a and b with (a-R/2) and (b-R/2), where R is the mirror plus position tolerance radius, works well in describing an embodiment where the starshade radius subject to a finite mirror size is optimized. Numeric evaluation of the diffraction integral may be performed to accurately design the shadow width.

Binary Apodization

Figure 3:
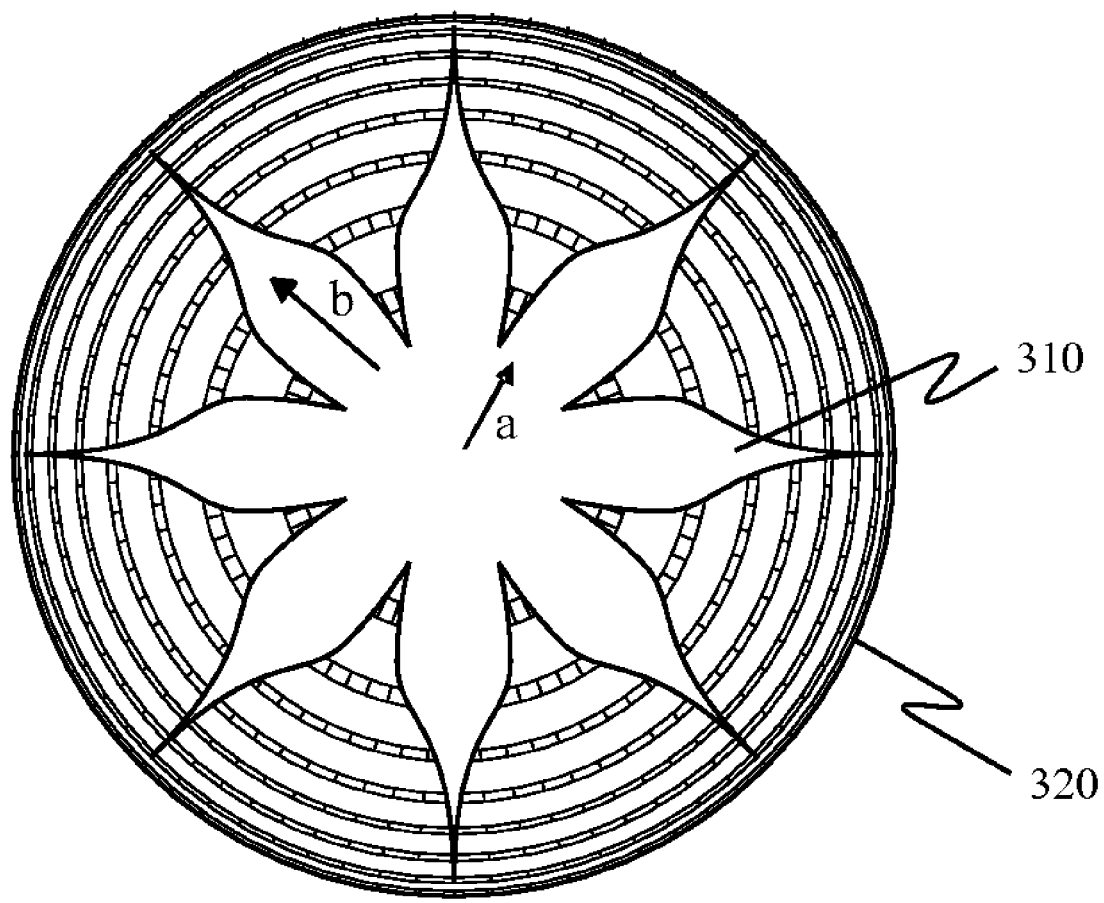
FIG. 3 shows an eight petal starshade overlaying Fresnel zones according to one embodiment of the invention.

Up to this point we have worked with circularly symmetric apodization functions, and have described embodiments where the starshade could be made partially transmitting as a function of radius. Other embodiments may use a binary mask, essentially one that is made of opaque material, patterned to simulate the needed transmission function. As shown in FIG. 3, an occulter with petals 310 is shown overlaying a central Fresnel zones 320. A coordinate system showing a and b is also shown. F is the distance to the occulter from the observation point, which is a distance s off axis on the x-axis. The diffraction integral takes place over the surface of the occulter which is given polar coordinates with radius $\rho$ and angle $\theta$.

The petal shape is the layout of a typical occulter. The center is opaque to a distance a off-axis. Another distance in radius b farther, and the width of the petal has fallen to 1/e of its original angular width. The gray circles in the background represent Fresnel zones. Each complete cycle from dark to light and back represents an extra wavelength of path distance from the source through a point that far off axis.

The petals 310 may be, tapered to mimic the transmission function and can provide an adequate approximation to circularly symmetric. Such embodiments advantageously avoid the risk of errors in transmission percentage, variations in thickness, or internal reflections causing severe scatter on the scale of interest. Such errors have the potential to adversely affect the depth of the shadow.

Because the opacity is complete out to some inner radius, the petals do not begin until that inner radius. Their angular widths taper proportional to the apodization function, eventually reaching a sharp point where the exponential function has decreased the opacity to nearly zero.

We can examine the effects of the petal approximation mathematically. Knowing that circularly symmetric apodization creates the dark shadow that is needed, we need only look at the difference between that integral and the integral over the petals. This remainder is preferably small.

In the petal analysis we cannot perform the analysis on-axis and then extend to the surrounding areas because of circular symmetry. The integral around any circle that is centered on both the starshade and the direction to the source will be the same on axis, so even a single petal would lead to good performance at the central point. For that reason we return to equation (2), the integral as it appears at a point on the x-axis, a distance s from the center. Subtracting away the circularly symmetric form we can write the remainder as:

$$R = \frac{k}{2\pi F} \int_a^\infty e^{\frac{ik\rho^2}{2F}} \rho \int_0^{2\pi} \left[ A(\rho,\theta) e^{\frac{ik\rho s \cos\theta}{F}} - A(\rho) e^{\frac{-ik\rho s \cos\theta}{F}} \right] d\theta \, d\rho \quad (28)$$

where $A(\rho)$ is the circularly symmetric apodization function and $A(\rho,\theta)$ is the binary petal version of the apodization function.

Inspection of this integral shows that, as long as $\cos\theta$ does not change by much across any one petal, the value of R will be small. Proper evaluation is complicated and has been performed with a computer for some typical cases of interest. Surprisingly and unexpectedly, a few dozen petals usually suffices. In some cases, the number of petals can be reduced as far as twelve without compromising the $10^{-10}$ required for planet finding.

Tolerancing

While the above description has provided a mathematical description of the starshade in various embodiments, this section considers tolerances for fabrication. The general insensitivity of the starshade to wavelength and to the rearrangement into petals permits acceptable tolerances to be achieved in a wide variety of embodiments. A number of different kinds of errors that would be encountered in using a starshade are specifically considered. For the purposes of this tolerance analysis we shall assume that the z-axis is the direction from the star to the starshade to the detector. Thus the starshade lies in the x-y plane.

Lateral Position is the position of the detector in the x-y direction relative to the line that extends from the source through the center of the starshade. If the telescope drifts too far laterally it will start to leave a shadow. This distance is set by the size of the shadow. The depth of the shadow increases as one approaches the center, and the telescope must be smaller than the diameter of the region with sufficient contrast. This region becomes larger as the shade becomes larger and more distant. Thus, an optimized starshade would fit the shadow size to the telescope size. Accordingly, in one embodiment of the invention, a margin of 20% on the starshade size appears reasonable. Thus we simply choose ±0.1 a as the constraint on lateral position. Other embodiments of the invention use margins of 10%, 15%, 25% or 30%. Constraints on lateral position may then be ±0.05 a, ±0.075 a, ±0.125 a or ±0.15 a.

Depth of Focus is the position of the detector on the z-axis, the line from the star through the center of the starshade. Because the insensitivity of the design to scaling by wavelength, it is similarly insensitive to scaling by distance. Equation (27) relates the depth of the shadow to the distance, F, through the dimensionless parameters, $\alpha$ and $\beta$. Because each scales as the square root of wavelength times F, the tolerance on F is set by the tolerance on $\lambda$. At the long wavelength end, the performance of the starshade degrades rapidly, so the design may start with the long wavelength constraint. Assuming that a ten percent degradation in wavelength is acceptable, so is a 10% change in distance. Since a typical design places the starshade at 50,000 km, the depth of focus is effectively 5000 km, which may be easy to implement.

Because of the circular symmetry built into the design, in one embodiment of the invention, there may be no constraint on $\theta_z$, the rotation angle about the line of sight. In some instances, the starshade may be spun about this axis to smooth out residual diffraction effects.

Pitch and Yaw is the alignment about the pitch axis $\theta_x$ and the yaw axis $\theta_y$. Because of the rotational symmetry the constraint on errors in alignment about the pitch axis, $\theta_x$ and yaw axis, $\theta_y$, may be combined into a single pointing error. The following analysis demonstrates that the design is highly forgiving to such errors.

We assume that the shade is out of alignment with the axis of symmetry by an angle $\phi$ about the y-axis, such that the shade appears foreshortened in the x direction by a factor of $\cos\phi$, which we shall approximate by $1-\epsilon$. The net optical path difference is small, about $(a+b)\theta\phi^2/2$ for small $\theta$ and $\phi$. As long as $\phi$ is $\ll 1$ the net path delay is a small fraction of a wavelength and may be ignored.

We start by rewriting equation (2) for the on-axis (s=0) case in Cartesian coordinates with the integration now taking place over the projected area which is foreshortened in one dimension $$E = \frac{k}{2\pi i F} e^{ikF} \left[ \begin{array}{l} \int e^{\frac{ikx^2}{2F}} \int e^{\frac{iky^2}{2F}} dx\,dy + \\ \int e^{\frac{ikx^2}{2F}} \int e^{\frac{iky^2}{2F}} e^{-\left(\frac{\sqrt{x^2+y^2}-a}{b}\right)^n} dx\,dy \end{array} \right]. \quad (29)$$

By a change of coordinate to $z=x/(1-\epsilon)$ we have $$E = \frac{k}{2\pi i F} e^{ikF} \left[ \begin{array}{l} (1-\epsilon) \int e^{\frac{iky^2}{2F}} \int e^{\frac{ikz^2(1-\epsilon)^2}{2F}} dy\,dz + \\ (1-\epsilon) \int e^{\frac{iky^2}{2F}} \int e^{\frac{ikz^2(1-\epsilon)^2}{2F}} e^{-\left(\frac{\sqrt{y^2+z^2(1-\epsilon)^2}-a}{b}\right)^n} dy\,dz \end{array} \right] \quad (30)$$

where the integration is now over a circularly symmetric shape as before. Converting to polar coordinates we find $$E = \frac{k}{2\pi i F} e^{ikF} \begin{bmatrix} \int_0^{2\pi} \int_0^a e^{\frac{ik\rho^2}{2F}} e^{-\frac{ik\rho^2\cos^2\theta(2\varepsilon-\varepsilon^2)}{2F}} \\ \rho\, d\rho\, d\theta + \\ \int_0^{2\pi} \int_a^\infty e^{\frac{ik\rho^2}{2F}} e^{-\frac{ik\rho^2\cos^2\theta(2\varepsilon-\varepsilon^2)}{2F}} \\ e^{-\left(\frac{\sqrt{\rho^2-\rho^2\cos^2\theta(2\varepsilon-\varepsilon^2)}-a}{b}\right)^n} \\ \rho\, d\rho\, d\theta \end{bmatrix} \quad (31)$$

By expanding and ignoring terms in $\varepsilon^2$ and higher, then differencing from the unperturbed integral we have an expression for the remainder caused by the misalignment:

$$R = \frac{k}{2\pi i F} \int_0^{2\pi} \int_0^a e^{\frac{ik\rho^2}{2F}} \left[ \frac{1-(1-\varepsilon)}{e^{\frac{ik2\varepsilon\rho^2\cos^2\theta}{2F}}} \right] \rho\, d\rho\, d\theta + \quad (32)$$

$$\frac{k}{2\pi i F} \int_0^{2\pi} \int_a^\infty e^{\frac{ik\rho^2}{2F}} e^{-\left(\frac{\rho-a}{b}\right)^n} \begin{bmatrix} 1-(1-\varepsilon) \\ e^{\frac{ik2\varepsilon\rho^2\cos^2\theta}{2F}} \\ e^{-\frac{2n\varepsilon\rho^2\cos^2\theta}{b\rho}\left(\frac{\rho-a}{b}\right)^{n-1}} \end{bmatrix} \rho\, d\rho\, d\theta.$$

Approximation of the exponentials in the brackets and dropping higher order terms reduces this to:

$$R = \frac{k^2\varepsilon}{2F^2} \left[ \int_0^a e^{\frac{ik\rho^2}{2F}} \rho^3\, d\rho + \int_a^\infty e^{\frac{ik\rho^2}{2F}} e^{-\left(\frac{\rho-a}{b}\right)^n} \rho^3\, d\rho \right] - \quad (33)$$

$$\frac{nk\varepsilon}{Fb} \int_a^\infty e^{\frac{ik\rho^2}{2F}} e^{-\left(\frac{\rho-a}{b}\right)^n} \rho^2 \left(\frac{\rho-a}{b}\right)^{n-1} d\rho.$$

To evaluate this we use our usual change of variable:

$$\alpha = a\sqrt{\frac{k}{F}}, \quad (34)$$

$$\beta = b\sqrt{\frac{k}{F}},$$

$$x = \rho\sqrt{\frac{k}{F}},$$

$$x = y\beta + \alpha$$

and integrate by parts. The higher order terms cancel as before, leaving us with an expression for the remainder $$R = n\varepsilon \int_0^\infty e^{\frac{i(\beta y+\alpha)^2}{2}} e^{-y^n} y^{n-1} dy \quad (35)$$

which is a form similar to that encountered in the original integral over the unperturbed aperture. We may therefore conclude that, to first order, $$R = \varepsilon R_{es} \quad (36)$$

where $R_{es}$ is the remaining electric field in the original circularly symmetric case. We conclude that misalignments of axis have almost no effect. They create a scale change in one axis that has no significant effect. Many degrees of misalignment can be tolerated, but in a practical mission it is likely that control issues will dictate pointing to a few arcminutes anyway.

Now considering Azimuthal Errors in Petal Shape. When we gathered the apodization function into the petals to make the function binary, we significantly perturbed the distribution of the electric field in the azimuthal direction. The total, when integrated over the circle at any given value of $\rho$, remained unchanged. Thus, within the azimuthal sector of width $2\pi/N$ radians at any fixed radius $\rho$, we may be free to move the obscuration around. The starshade may be insensitive to shear in the azimuthal direction. In one embodiment, the shear is kept from slipping into the region of the adjacent petals.

Now turning to Radial Errors in Petal Shape. If the petal is stretched or compressed such that the smoothness of the fall of the apodization is maintained, then there may be little impact on the performance. This may be reflected in the insensitivity to alignment, where the petals in some directions are changed in projected length, but there is no noticeable impact on performance. The petal analysis may also show that each petal may independently create its own deep shadow zone. Hence, according to one embodiment of the invention, radial scaling of modest amounts does not hurt the performance.

Now turning to Truncation of Petals. Mathematically, the apodization carries out to infinity. In the case of a binary mask, this means that petals extend to infinity, something which clearly cannot be done in practice. At what radius is it safe to truncate the petal? We can write the remainder of the electric field created by truncating at an outer radius T.

$$R = \int_T^\infty e^{\frac{ix^2}{2}} e^{-\left(\frac{x-a}{\beta}\right)^n} x\, dx \quad (37)$$

which is definitely less than $$R = \frac{1}{N} e^{-\left(\frac{T-a}{\beta}\right)^n} \quad (38)$$

per petal. The remainder due to truncation can be safely ignored in a typical case when the thickness of each petal has fallen below about 0.1 mm. Thus the petals must be sharp at their tips, but do not have to be controlled at a microscopic level.

Finally we consider the case where the shape changes in a discontinuous manner. There are many possible classes of such error. Consider a petal that is missing a chunk along one edge. The missing part can be contained within one half zone or spread over several. To the extent that the missing area is monotonic across the zones, the net effect is less than the largest area within one half zone. So, the size of the missing area must be less than $10^{-5}$ of the starshade area, but can be substantially larger to the extent that it spread over several zones.

According to another embodiment of the invention, the shade may be opaque to the needed level. If the star is to be suppressed to better than a ratio S, then the shade may transmit less than 1/S of the incident radiation.

The occulter may also include one or more pinholes that may simulate a level of transparency. By the Fresnel integral and according to one embodiment of the invention, the area of the pinholes may represent 1/S of the area of the starshade if uniformly distributed. According to another embodiment, if the pinholes are contained in one zone, they may add up to less than $1/\sqrt{S}$ $1/\sqrt{S}$ of the area of that zone.

In some occasions the occulter may also perform with the inclusion of large Holes. A single large hole can be restricted to a single zone. A zone has an area $$A_z = \pi \lambda F \quad (39)$$

Accordingly, the hole may have an area less than $$A_{Hole} < \frac{\pi \lambda F}{\sqrt{S}}. \quad (40)$$

In one embodiment of the invention, the occulter performs properly with a hole as large as about square centimeter. In other embodiments of the invention, the occulter may perform properly with a whole as large as 0.5, 0.75, 1.25 or 1.5 centimeters.

While various tolerances have been discussed above, the occulter may have other deviations in it's shape and/or size that do not significantly hamper it's performance. In other embodiments deviations may also somewhat enhance the occulters performance. A deviation in apodization function on the order of $\epsilon$ can cause a deviation on the order of $\epsilon^2$ in shadow depth. Thus, across some part of the spectrum and some part of the shadow, the presence of deviations of order $\epsilon$ may cause no significant change in shadow profile down to a level of about $\epsilon^2$. Deeper in the shadow, these deviations can cause regions of the shadow to be deeper at some points and some wavelengths at the cost of other points and wavelengths. For some applications these behaviors may be of significant value but must be addressed as an secondary feature to the overall occulter performance.

EXAMPLES

Example 1

Figure 4A:
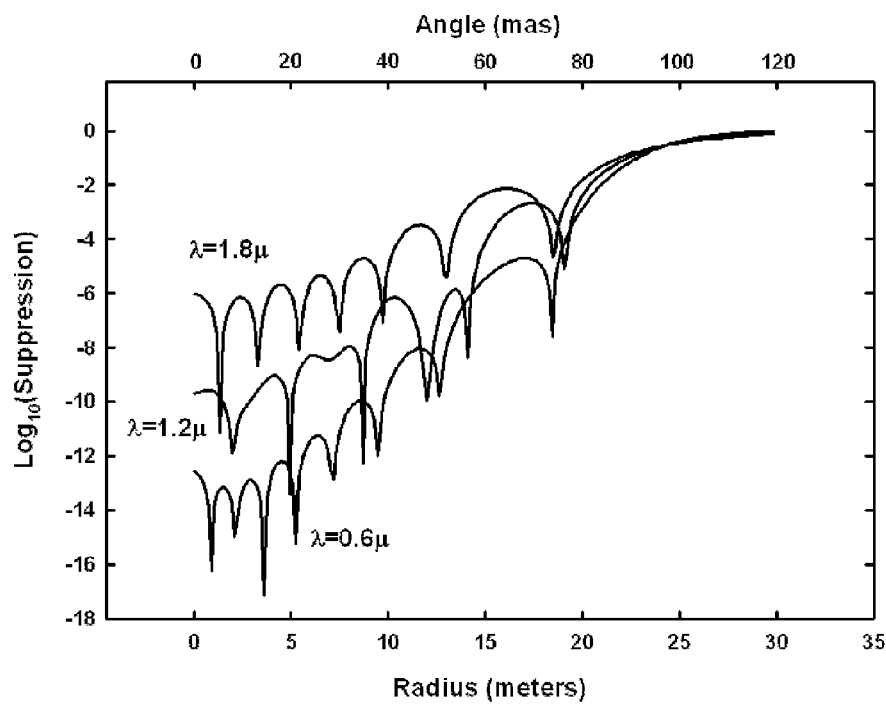
FIG. 4A shows a plot of contrast versus radius for three wavelengths according to another embodiment of the invention.
Figure 4B:
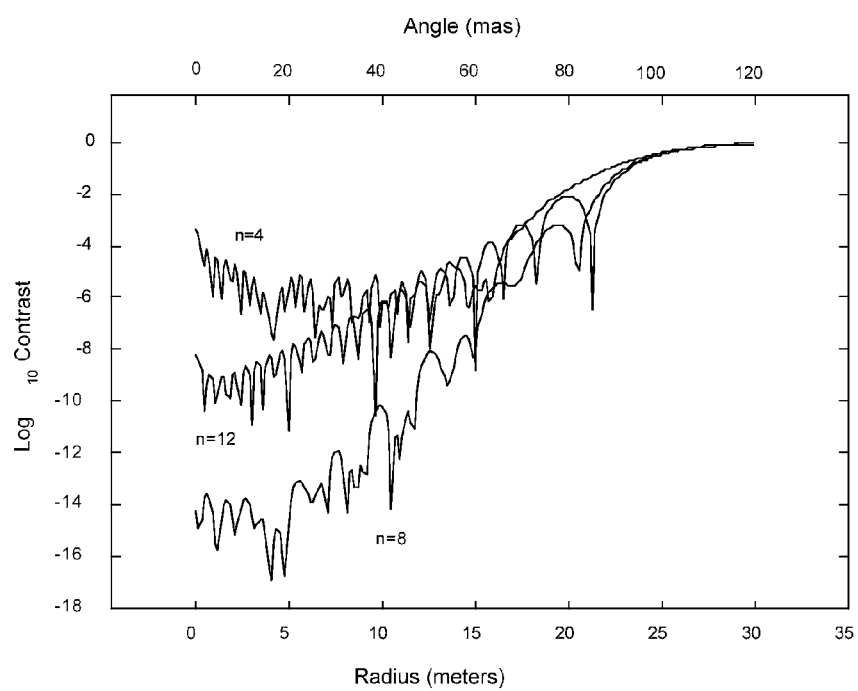
FIG. 4B shows contrast as a function of radius and angle off-axis for a starshade for n=8, n=12, and n=4 according to one embodiment of the invention.
Figure 5:
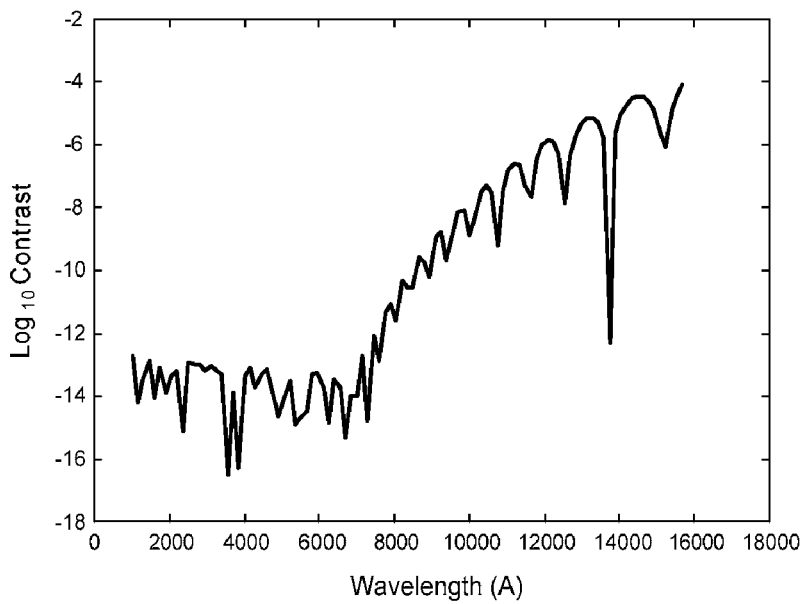
FIG. 5 shows a plot of contrast versus wavelength according to another embodiment of the invention.

Starshade. According to one embodiment of the invention, an occulter may be used within a telescope used to find water planets around stars. Accordingly, in one example, a starshade may be used with parameters n=6, a=b=12.5 m, and F=50,000 km. With twelve petals we find the performance shown in FIG. 4A. The brightness of a star on-axis is suppressed a factor of $10^{13}$ at 0.6µ wavelength. At 1.8µ the suppression factor has fallen to $10^6$ as fewer Fresnel zones are covered. The transmission of the occulter rises to nearly 100% in just 25 m, which demonstrates that an object 0.1 arcseconds off-axis would be visible in the shadow. FIG. 4B shows the contrast as a function of radius and angle off-axis for this starshade. Three values of n are shown for n=8, n=12, and n=4. The shadow drops from full transmission to below 10-12 in under 30 m at visible light wavelengths. Across the top is shown the equivalent angle, demonstrating that 10-10 suppression is achievable in about a tenth of an arcsecond. As shown, n=8 appears to the best. Levels as low as 10-14 are achieved. FIG. 5 shows contrast on axis for the starshade shown as a function of wavelength. The highest contrast achieved is 10-14, which may be simply the limit of accuracy of the numerical integration.

Figure 6:
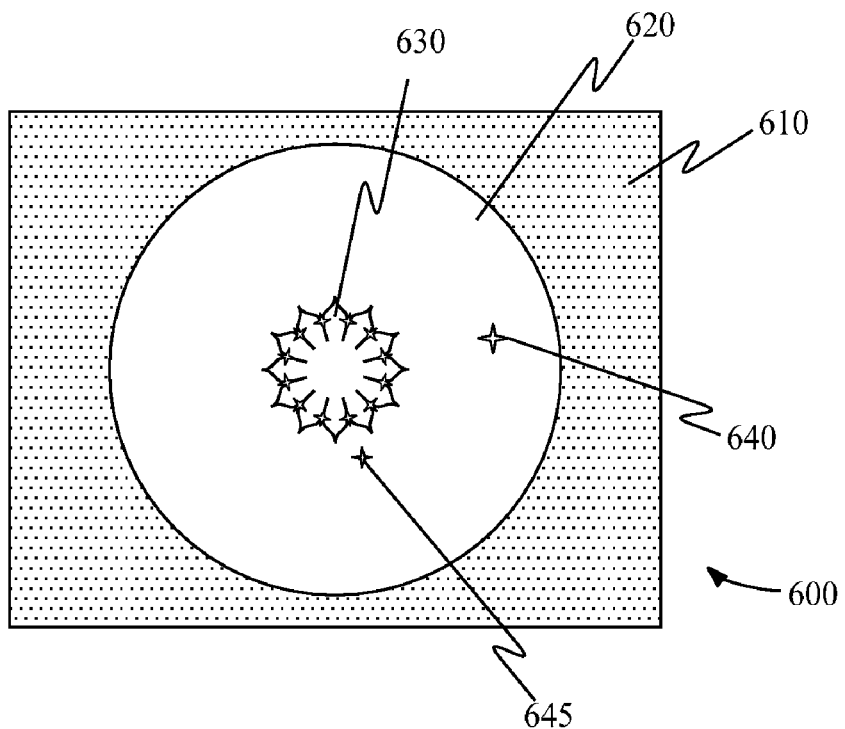
FIG. 6 shows an image of a starshade on an imager according to one embodiment of the invention.

FIG. 6 shows an image incident on an imager 610 from a telescope including an occulter according to one embodiment of the invention. The imager 610 shows an image of the field of view 620 that includes an image of an occulter 630 as well as images of objects within the telescopic field of view 640, 645, such as planets. The image of the occulter 630 shows the flower like shape of the occulter. Small amounts of diffraction may be imaged around the shade, especially at the bases of the petals.

Example 2

Laboratory Shade. According to another embodiment of the invention a starshade may be used with n=6, and a=b=8 mm with 42 petals. Testing this starshade, a beam of solar radiation 30 m from a pinhole and 10 m from an shadow plane. Light at the center of the shadow was detected and found to be below $10^{-7}$ of the direct beam. What little signal was left was most likely scattering in the air or off the walls of the dark tunnel.

Figures 7A, 7B:
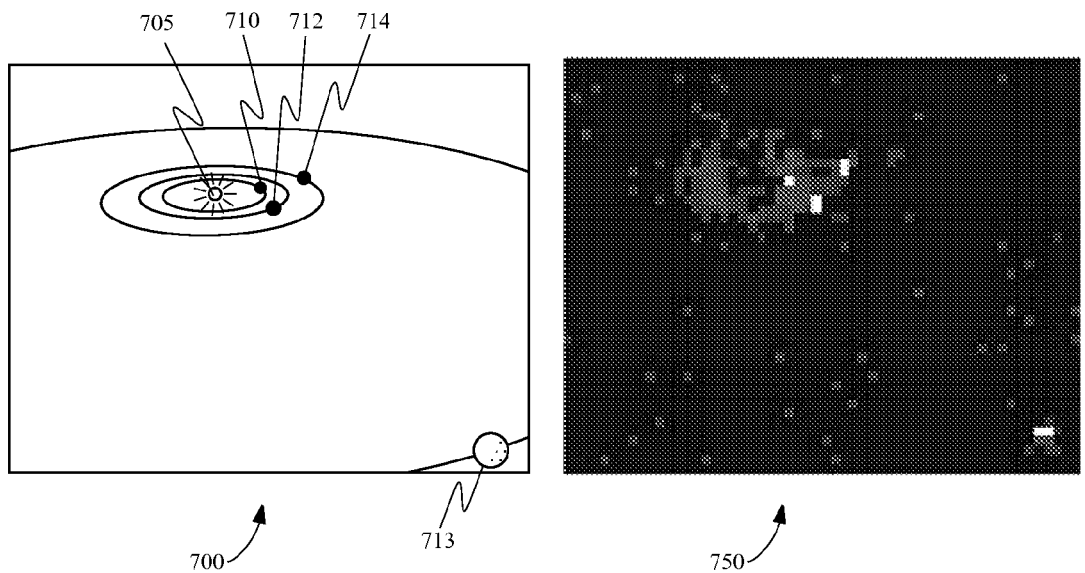
FIG. 7A shows an artist's conception of the solar system.
FIG. 7B shows a simulation of an image captured from 10 pc away using a large telescope using an occulter according to embodiments of the invention.

FIG. 7A shows an artist's conception of a solar system 700. The solar system includes a star 705 and four planets 710, 712, 713, 714. FIG. 7B shows a simulation of an image 750 captured of the image in FIG. 7A from 10 pc away using a large telescope with an occulter according to embodiments of the invention. The basic features of the planetary system are visible. The brightness of the star may be masked using the occulter allowing imaging of the planets within the solar system.

Figure 8:
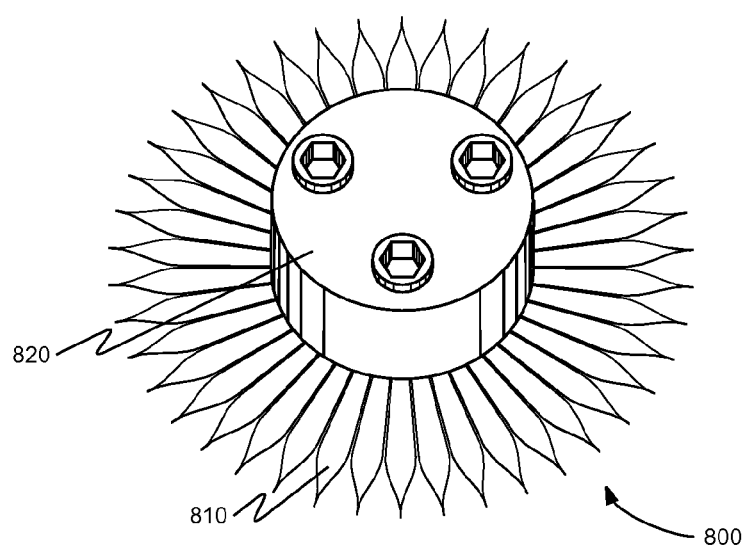
FIG. 8 shows an occulter according to one embodiment of the invention.

FIG. 8 shows an occulter 800 according to embodiments of the invention. This occulter produced $10^{-7}$ suppressions in air. The occulter includes a solid base 820 with mounting bolts. Centrally arrayed around the occulter are 42 petals 810. Occulters of various dimensions and/or numbers of petals may also be used according to embodiments of the invention. Those of skill in the art will recognize and understand how to implement occulters according to the embodiments of the invention.

Having described several embodiments, it will be recognized by those of skill in the art that various modifications, alternative constructions, and equivalents may be used without departing from the spirit of the invention. Accordingly, the above description should not be taken as limiting the scope of the invention, which is defined in the following claims.

What is claimed is:

1. An occulter that comprising an opacity apodization function of the form $$\begin{cases} \exp\left(-\left(\frac{\rho-a}{b}\right)^n\right) & \text{for } \rho > a \\ 1 & \text{for } \rho \leq a \end{cases},$$

wherein:

ρ is a distance from a center of the occulter;

a and b are predetermined constants having dimensions of length; and n is a predetermined dimensionless constant.

2. The occulter recited in claim 1, wherein b is substantially equal to a.

3. The occulter recited in claim 1, wherein $$\frac{b^2 k}{F} \quad \frac{b^2 k}{F}$$

is substantially greater than n, where k is a wave number of light incident on the occulter and F is a distance from the occulter to a focal plane.

4. The occulter recited in claim 1, wherein the occulter is substantially cylindrically symmetric.

5. The occulter recited in claim 4, wherein an opacity of the occulter varies radially from an axis of the occulter.

6. The occulter recited in claim 4, wherein the occulter has an interior region that is substantially opaque to light incident on the occulter and an outer region that is at least partially transmissive to the light.

7. The occulter recited in claim 6, wherein a is a radius of the inner region and b is a width of the outer region.

8. The occulter recited in claim 6, wherein the outer region comprises a plurality of petal-shaped protrusions.

9. The occulter recited in claim 8, wherein the number of petal-shaped protrusions is less than 50.

10. The occulter recited in claim 8, wherein the number of petal-shaped protrusions is less than 20.

11. The occulter recited in claim 1, wherein the shape of the occulter vary by less than about 20%.

12. The occulter recited in claim 1, wherein the occulter comprises a deviation $\epsilon$ in the apodization function that causes a shadow depth deviation on the order of about $\epsilon$hu 2.

13. A method of occulting light, the method comprising:
disposing an occulter in a path of the light, the occulter implementing an apodization function of the form $$\exp\left(-\left(\frac{\rho - a}{b}\right)^n\right),$$

wherein:
$\rho$ is a distance from a center of the occulter;
a and b are predetermined constants having dimensions of length; and
n is a predetermined dimensionless constant.

14. The method recited in claim 13, wherein b is substantially equal to a.

15. The method recited in claim 13, wherein $$\frac{b^2 k}{F} \quad \frac{b^2 k}{F}$$

is substantially greater than n, where k is a wave number of the light and F is a distance from the occulter to a focal plane.

16. The method recited in claim 13, wherein the occulter is substantially cylindrically symmetric.

17. The method recited in claim 16, wherein an opacity of the occulter varies radially from an axis of the occulter.

18. The method recited in claim 16, wherein the occulter has an interior region that is substantially opaque to light incident on the occulter and an outer region that is at least partially transmissive to the light.

19. The method recited in claim 18, wherein a is a radius of the inner region and b is a width of the outer region.

20. The method recited in claim 18, wherein the outer region comprises a plurality of petal-shaped protrusions.

21. The method recited in claim 20, wherein the number of petal-shaped protrusions is less than 50.

22. The method recited in claim 20, wherein the number of petal-shaped protrusions is less than 20.

23. A telescope system comprising:
one ore more optical elements; and
an occulter that implements an opacity apodization function of the form $$\begin{cases} \exp\left(-\left(\frac{\rho - a}{b}\right)^n\right) & \text{for } \rho > a \\ 1 & \text{for } \rho \leq a \end{cases},$$

wherein:
$\rho$ is a distance from a center of the occulter;
a and b are predetermined constants having dimensions of length; and
n is a predetermined dimensionless constant.

* * * * *